UNITED STATES PATENT OFFICE.

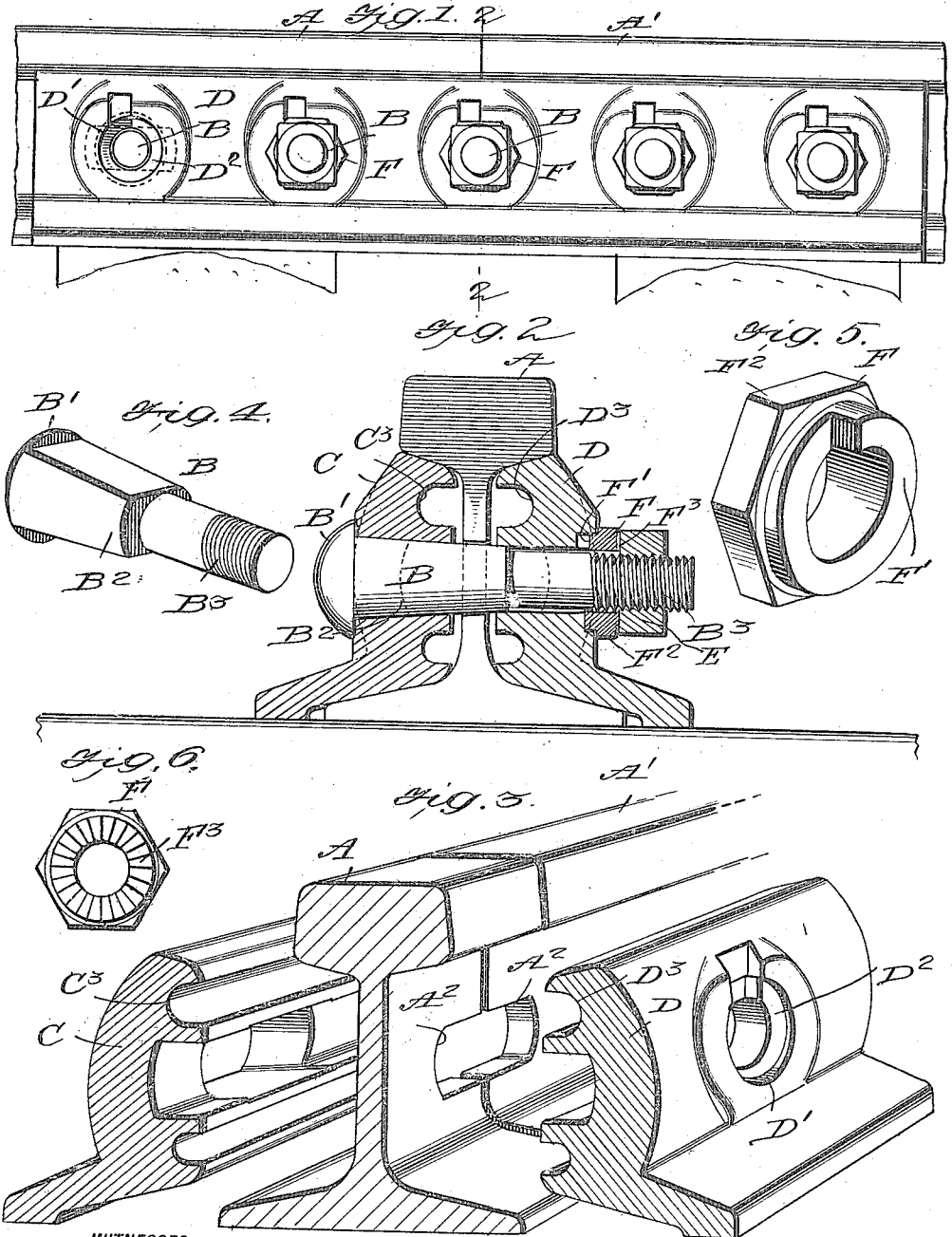

TOWNSON HAND, OF NEW HAVEN, CONNECTICUT.

RAIL-JOINT.

1,208,551. Specification of Letters Patent. Patented Dec. 12, 1916.

Application filed December 8, 1915. Serial No. 65,764.

*To all whom it may concern:*

Be it known that I, TOWNSON HAND, a citizen of the United States, and a resident of New Haven, in the county of New Haven and State of Connecticut, have invented a certain new and useful Improvement in Rail-Joints, of which the following is a specification.

My present invention relates generally to rail joints, and more particularly to a simple accepted type of joint including certain structural improvements, the object of which is to generally increase the effectiveness of apparatus of this character in operation and increase the strength and durability of the several parts, as well as to prevent all danger of their relative displacement in use. These improvements together with the advantages attained thereby, will be better understood from the following detail description thereof, referring to the accompanying drawing forming a part of this specification, and wherein—

Figure 1 is a side elevation of a joint constructed in accordance with my invention. Fig. 2 is a central vertical transverse section therethrough, one of the abutting rail ends appearing in elevation, taken substantially on line 2—2 of Fig. 1. Fig. 3 is a detail sectional perspective view illustrating the abutting rail ends and the angle bars in detached relation. Fig. 4 is a detail perspective view of one of the connecting bolts removed. Fig. 5 is a detail perspective view of the washer, looking at the cam face thereof, and Fig. 6 is a detail face view of the washer looking at the toothed face thereof.

Referring now to these figures, the rails A and A' which are provided adjacent their abutting ends with longitudinally slotted openings as seen in dotted lines in Fig. 1, for the side connecting bolts, are also provided as particularly seen in Fig. 3, with openings intermediate their webs and at their abutting ends which, when together as illustrated in the figure just mentioned, form longitudinally slotted openings $A^2$ for the central connecting bolt, the present joint being preferably of the five bolt type.

Each of the bolts B, one of which is shown in detail in Fig. 4, is provided with a head B' at one end, and with a flattened tapering body $B^2$, at one end of which the head B' is formed and at the other end of which is a reduced threaded extension $B^3$.

Of the two angle bars C and D, the angle bar C is provided with slotted openings which the tapered body $B^2$ interfits in passing therethrough, it being noted from Fig. 2 in particular that the tapered body of the bolt also extends through the slotted openings of the rail, the body of the central bolt extending through the slotted opening formed by the openings in the rail ends just previously described so as to afford a broad bearing surface for the rail ends to prevent their relative movement in a vertical direction in use. The other angle bar D has round openings through which the extensions $B^3$ of the bolts pass and, as best seen in Fig. 3, is provided around the outer ends of each of its said openings, with a counterbore D' at the base of which is a cam face $D^2$.

A nut E is threaded upon the extension $B^3$ of each of the connecting bolts, and a washer F is interposed between the nut and the angle bar D, a portion of which washer extends into the counterbore D' and is provided with a cam face F' adapted to coöperate with the cam face $D^2$ in a manner and for a purpose to be presently set forth. The washer F is also provided with a polygonal portion $F^2$ and with a circular series of teeth $F^3$ upon its outer face which bite into the material of the nut E when the latter is screwed tightly thereagainst upon the bolt. Thus, with the parts in this described position and as shown in Fig. 2, any turning movement of the nut E off of the bolt will be communicated to the washer F and the latter upon turning will occasion a coaction of the cam faces F' and $D^2$ to force the washer longitudinally of the bolt and outwardly against the nut whereby to bind the threads of the latter with the threads of the bolt B and thus lock the parts against further relative movement.

In order to strengthen the angle bars C and D I preferably provide their upright portions with outer convexly curved surfaces and for the purpose of accommodating bond wires and the like in such manner as to prevent the same from breaking or the bolt from changing, I preferably provide the inner faces of the angle bars with longitudinal grooves $C^3$ and $D^3$ which, it will be noted, are vertically spaced from the line of bolts and thus isolate the wires entirely from the bolts themselves.

It is to be understood, of course, that the slotted openings of the rail web are substantially greater in length than the greatest width of the bodies of the bolts, so that in generally improving the effectiveness of apparatus of this character, and prolonging the life as well as increasing the strength of its parts, I still allow for the expansion and contraction of the rails which is natural under service conditions. It is also to be understood that when the joint is to be taken apart, for instance, for purposes of repair or substitution of parts, it is simply necessary that rotation of the washers F be prevented when the nuts E are loosened, the polygonal face $F^2$ of each of the washers being provided for this purpose to permit of effective engagement of a wrench or other suitable implement with the washer.

I claim:

1. In a device of the character described, a bolt, a nut threaded thereon, an abutment through which the bolt passes having a cam face around the bolt, and a washer disposed between the said abutment and the said nut, having an inner cam face for engagement with the cam face of the abutment, said cam faces adapted to force the washer and nut longitudinally of the bolt when the washer is turned, and having a toothed outer face for gripping the said nut.

2. A rail joint including angle bars, bolts extending through and connecting said bars, nuts threaded upon said bolts, and washers disposed between the said nuts and one of the angle bars and having means for gripping the former, said washers and said adjacent angle bars having relatively engaging means whereby to force the former longitudinally of the bolts and against the nuts to bind the latter with the bolt threads when the washers are turned.

3. A rail joint including angle bars, bolts extending through and connecting said bars, nuts threaded upon said bolts, and washers disposed between said nuts and one of the angle bars and engaged by the former, said washers and said adjacent angle bar having relatively engaging cam faces the pitch of which is greater than that of the bolt threads whereby to force the former longitudinally of the bolts and against the nuts to bind the latter with the bolt threads when the washers turn, and said washers also having their outer faces provided with nut gripping means.

4. A rail joint including angle bars, bolts extending through and connecting said bars, nuts threaded upon said bolts, and washers disposed between said nuts and one of the angle bars and having means for gripping the former, said washers and said adjacent angle bar having relatively engaging cam faces whereby to force the washers and nuts longitudinally of the bolts and into gripping relation with the bolt threads when the washers and nuts turn on the bolts away from the said angle bars.

5. In a device of the character described, a bolt, a nut threaded thereon, an abutment through which the bolt passes, and a washer disposed between the said abutment and the said nut and having means for gripping the nut, said abutment and said washer having adjacent cam faces engaging in planes substantially at right angles to the axis of the bolt, for the purpose described.

TOWNSON HAND.

Witnesses:
F. C. RUSSELL,
ANNIE SINGERMANN.

Copies of this patent may be obtained for five cents each, by addressing the "Commissioner of Patents, Washington, D. C."